United States Patent [19]

Trapani et al.

[11] Patent Number: 5,408,066
[45] Date of Patent: Apr. 18, 1995

[54] POWDER INJECTION APPARATUS FOR A PLASMA SPRAY GUN

[76] Inventors: Richard D. Trapani, 147-10 41 Ave., Flushing, N.Y. 11355; Roopnarine Tilkaran, 130-45 127 St., South Ozone Park, N.Y. 11420; Joseph P. Mercurio, 1018 Park Lane E., Franklin Square, N.Y. 11010; Henry A. Budke, Jr., 6 Dorothy La., Kings Park, N.Y. 11754; Michael R. D'Arpa, 68 Old Farm Rd., Levittown, N.Y. 11756; Burton A. Kushner, 23 E. Park Dr., Old Bethpage, N.Y. 11804

[21] Appl. No.: 135,703

[22] Filed: Oct. 13, 1993

[51] Int. Cl.⁶ .............................................. B23K 10/00
[52] U.S. Cl. .............................. 219/121.47; 219/76.16; 219/76.15; 219/121.49; 219/121.51; 427/446
[58] Field of Search ........... 219/121.47, 76.16, 121.49, 219/121.48, 121.51, 76.15; 427/446, 569, 535

[56] References Cited

U.S. PATENT DOCUMENTS

| | | | |
|---|---|---|---|
| 2,922,869 | 1/1960 | Giannini et al. | 219/75 |
| 3,914,573 | 10/1975 | Muehlberger | 219/121.47 |
| 4,140,892 | 2/1979 | Muller | 219/121.5 |
| 4,445,021 | 4/1984 | Irons et al. | 219/121 |
| 4,990,739 | 2/1991 | Zaplatynsky | 219/121.47 |
| 5,013,883 | 5/1991 | Fuimefreddo et al. | 219/121.47 |
| 5,148,986 | 9/1992 | Rusch | 219/121.47 |

Primary Examiner—Mark H. Paschall
Attorney, Agent, or Firm—H. S. Ingham

[57] ABSTRACT

A powder injection apparatus for a plasma spray gun includes a block having channelling therein for liquid coolant. A powder port extends through the block in proximity to the channelling so as to be cooled by coolant flowing therein. The port has a powder inlet receptive of spray powder in a carrier gas, and has a powder outlet end formed as a tubular protrusion extending from the block. A pair of extensions extend from the block proximate the protrusion on diametrically opposite sides thereof. Each extension has at least one orifice therein disposed so as to direct gas onto the protrusion. A pair of additional gas exit openings direct gas to the face of the gun.

11 Claims, 5 Drawing Sheets

POWDER INJECTION APPARATUS FOR A PLASMA SPRAY GUN

This invention relates to plasma spray apparatus and particularly to powder injection apparatus for a plasma spray gun.

BACKGROUND OF THE INVENTION

Thermal spraying, also known as flame spraying, involves the heat softening of a heat fusible material such as metal or ceramic, and propelling the softened material in particulate form against a surface which is to be coated. The heated particles strike the surface where they are quenched and bonded thereto. A thermal spray gun is used for the purpose of both heating and propelling the particles. In one type of thermal spray gun, the heat fusible material is supplied to the gun in powder form. Such powders are typically comprised of small particles, e.g., between 100 mesh U.S. Standard screen size (149 microns) and about 2 microns.

A plasma spray gun, such as disclosed in U.S. Pat. No. 4,445,021, is a thermal spray gun that utilizes an arc generated plasma flame to produce the heat for melting of the powder particles. The primary plasma gas is generally nitrogen or argon, and hydrogen or helium is usually added to the primary gas. The carrier gas for transporting powder is generally the same as the primary plasma gas, although other gases may be used in certain situations. A plasma spray gun basically comprises a rod-shaped cathode and a tubular nozzle-anode connected to sources of power and plasma-forming gas. The arc-heated high temperature plasma stream flows axially from the nozzle. The guns are generally water cooled. Various configurations have been disclosed for auxiliary annular gas flows around the plasma stream for such purposes as shrouding and cooling; typical arrangements are shown in U.S. Pat. Nos. 2,922,869 and 4,445,021.

Powder injection into a plasma gun for spraying a coating must be effected from the side of the plasma stream because of the preemptive presence of the centrally located cathode. There is a tendency for a small amount of the powder to adhere to nozzle surfaces, resulting in buildup which can interfere with the spraying and coating. For example buildup on one side can cause the spray stream to skew, or a piece of the buildup may break off and deposit as a defect in the coating.

Buildup is reduced significantly by feeding the powder into the stream externally with a lateral powder injector as shown in the above mentioned U.S. Pat. No. 4,445,021. However, even this type of feed sometimes results in detrimental buildup on the nozzle face near the injector and the plasma stream. Moving the injector away from the nozzle helps, but at a sacrifice of heating efficiency to the powder.

Some improvement has been achieved with a plasma spray device taught in U.S. Pat. No. 5,013,883 of the present assignee. The front face of this device has a shallow annular recession. A ring member has a plurality of arcuately spaced holes directed radially inwardly to the recession. A toroidal vortex is thereby effected at the face so as to inhibit powder from depositing on the front face. This device has had some success. However, buildup on the powder injection assembly has continued to be a problem, particularly near the end of the powder injection port at very high spray rates of fine powder.

SUMMARY OF THE INVENTION

Therefore, an object of the present invention is to provide a plasma spray apparatus with reduced tendency for powder buildup on the powder injection assembly. Another object is to provide such an apparatus with reduced tendency for powder buildup also on the nozzle face. A further object is to provide such an apparatus with a capability for very high spray rates of fine powder without significant powder buildup.

The foregoing and other objects are achieved, at least in part, by powder injection apparatus for a plasma spray gun, comprising a block having channelling for liquid coolant therein including an inlet receptive of coolant and an outlet for discharging the coolant from the block. A powder port extends through the block in proximity to the channelling so as to be cooled by coolant flowing therein. The port has a powder inlet receptive of spray powder in a carrier gas, and has a powder outlet end formed as a tubular protrusion extending from the block.

A gas jetting means directs at least one jet of gas onto the protrusion so as to cool same and inhibit powder from depositing thereon. In a preferred embodiment, the jetting means comprises a pair of extensions extending from the block proximate the protrusion on diametrically opposite sides thereof, each extension having at least one orifice therein disposed so as to direct gas onto the protrusion.

DETAILED DESCRIPTION OF THE INVENTION

Figure 1:
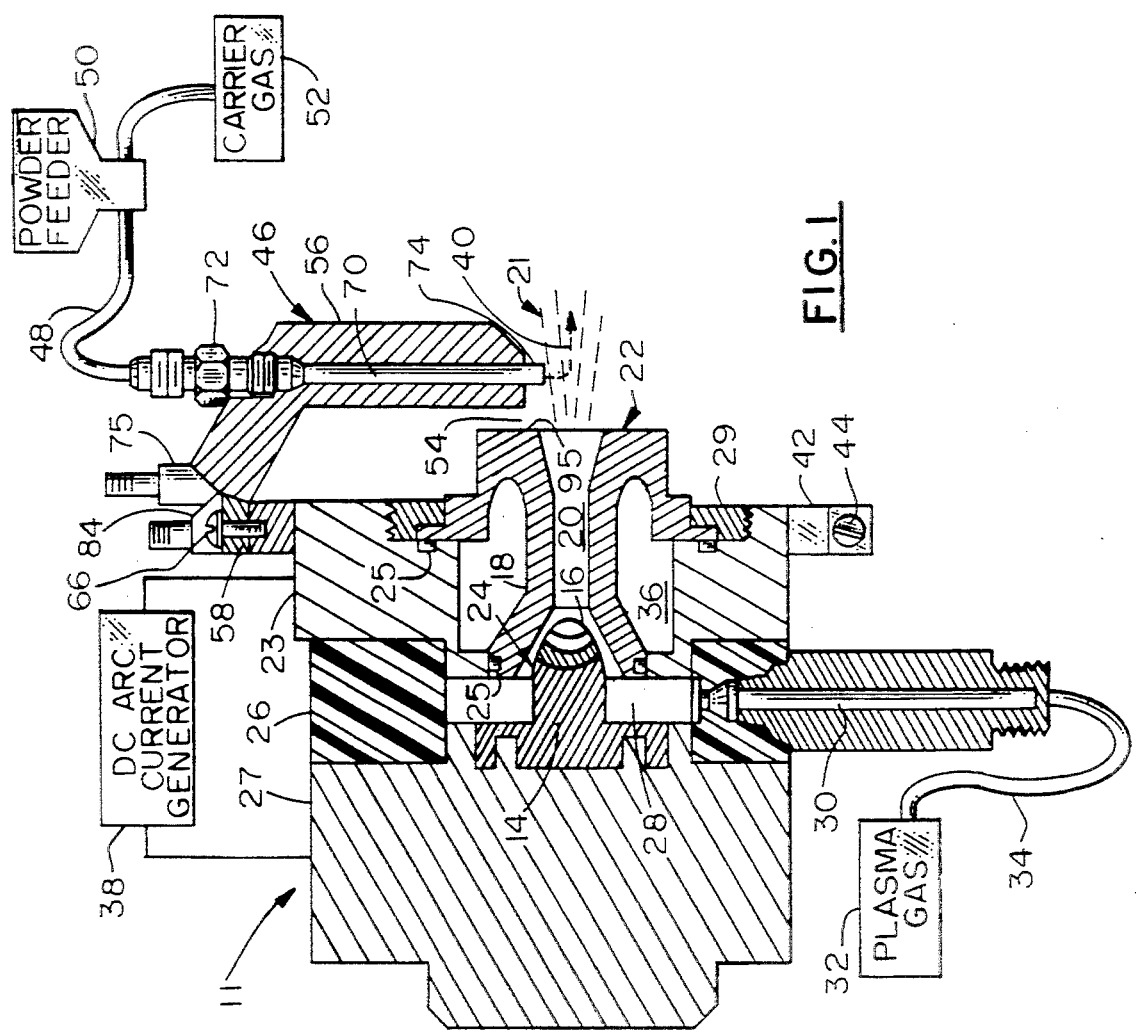
FIG. 1 is a vertical section of a plasma spray apparatus incorporating the invention.

The invention is utilized with an arc plasma spray gun, for example of the type described in the aforementioned U.S. Pat. No. 4,445,021 and sold as a Metco Type 10MB (TM) plasma gun by The Perkin-Elmer Corporation. In FIG. 1 there is illustrated a simplified version of such a gun 11.

Within the interior of the gun is a tungsten cathode member 14 which is generally rod-shaped with a conical tip 16 at one end (the forward end in the direction of flow), and a hollow cylindrical anode nozzle member 18 containing an axial bore 20 therethrough of conventional configuration and cross-sectional dimensions, coaxial with the cathode member.

The end from which the plasma stream 21 issues will hereinafter be referred to as the outlet end 22 of the gun and the other end as the inlet end 24. The nozzle be (typically of copper) is fitted into a forward gun body 23 of electrically conducting metal such as brass, with O-rings 25 as required for sealing. The nozzle is held in with a retainer ring 29.

The cathode 14 is similarly retained in an electrically conducting rear gun body 27. The two bodies sandwich an insulating member 26, and this assembly is held together with insulated screws (not shown). The insulator coaxially surrounds the medial portion of cathode 14, serves to insulate the cathode 14 from the anode 18, and forms an annular gap as an interior plenum 28 for passing a plasma forming gas to the inlet end of nozzle member. A gas distribution ring (not shown) may be disposed in the plenum. Gas is supplied to the plenum chamber through an inlet 30 from a source 32 of at least one plasma-forming gas via a gas hose 34. Water cooling is provided including a coolant chamber 36 about the nozzle member.

Electrical current from a DC power source 38 is applied between the anode 18 and the cathode 14 to generate a high intensity arc in the nozzle bore 20. The plasma-forming gas is heated thereby to a high temperature, partially ionized gas which issues from the nozzle as the high velocity plasma stream 21. Powder 40 of metal, ceramic, carbide and/or plastic is injected laterally into the stream outside the nozzle 18 to be melted or at least heat softened and propelled to a workpiece to be coated.

A ring member 42 is affixed concentrically to the front of the gun. This ring is conveniently a split ring clamped on with a tightened machine screw 44 to the gun body 23. At least one powder injection assembly 46 is mounted on the ring. The assembly is receptive of powder in a carrier gas via a feed tube 48 from a conventional powder feeder 50 and a source 52 of compressed gas such as nitrogen. The assembly is mounted with a small gap 54, such as 0.25 mm from the nozzle face. For high powder feed rates, two such assemblies (only one shown) with powder from separate feeders may be mounted on the ring spaced arcuately, for example, by 90°.

Figure 2:
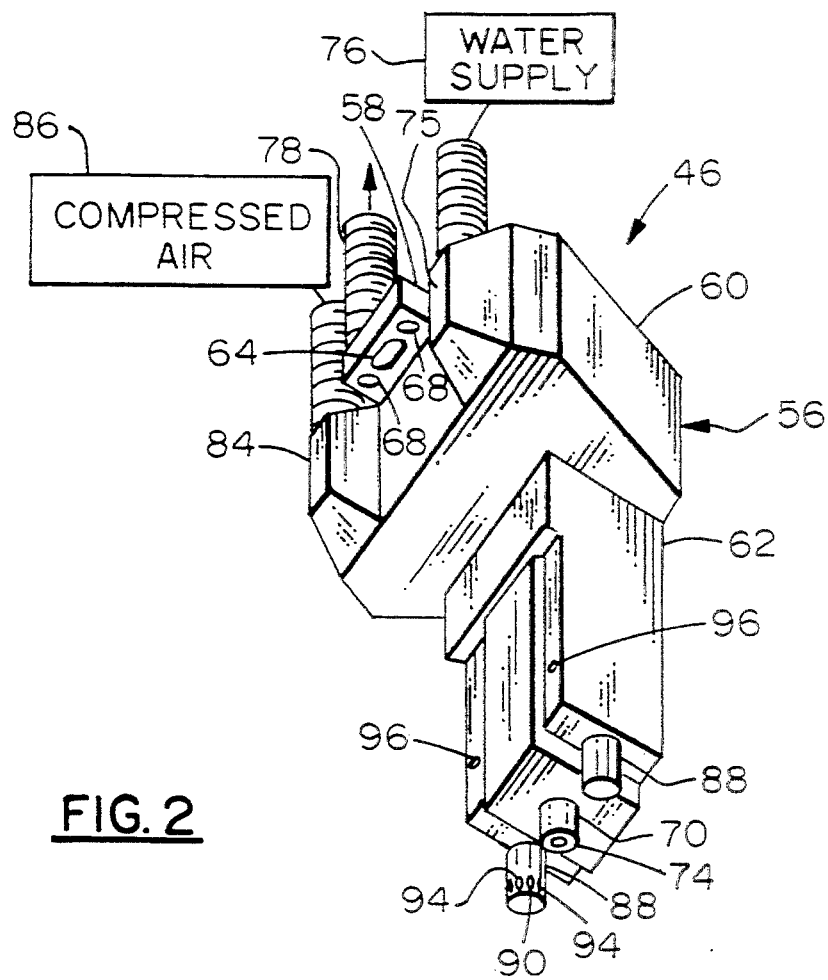
FIG. 2 is a perspective of a powder injection assembly portion of the apparatus FIG. 1.

FIG. 2 is a perspective of the powder injection assembly 46 viewed obliquely from below the side facing the plasma gun 11. The assembly includes a block 56 of thermally conductive material such as copper, brass or aluminum. A mounting tab 58 is brazed to a mounting section 60 of the block that extends at a angle from the main section 62. The tab has a central hole 64 therein through which a machine screw 66 (FIG. 1) passes for threading into the ring member 42. A pair of additional holes 68 fit over corresponding pins (not shown) in the ring to position the block.

A tubular member 70 forming a powder port extends through the block. A powder inlet fitting 72 (FIG. 1) connects the port to the feed tube 48 from the powder feeder 50. The port has a powder outlet end that is formed as a tubular protrusion 74 extending from the block 56. (An alternative means for forming the powder port is to machine the protrusion from the block, omitting the tubular member and simply convey the powder through a bore in the block.) Powder in the carrier gas is injected from the protrusion end into the plasma stream. The powder port outlet should be configured and positioned in the conventional or other desired manner, for example as a No. 2 powder port for the aforementioned Metco Type 10MB plasma gun.

Figure 3:
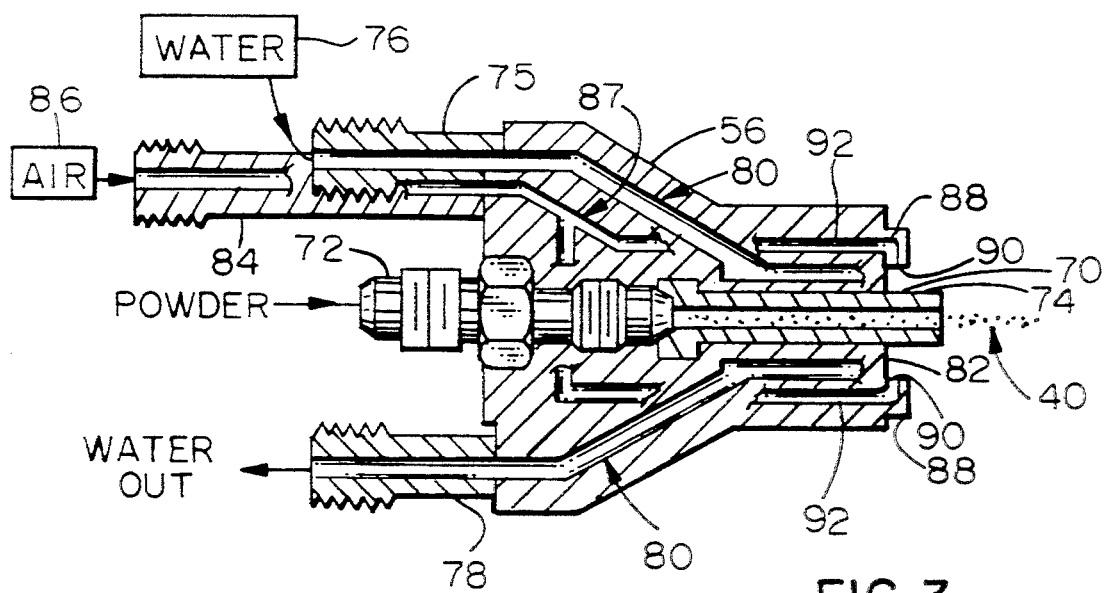
FIG. 3 is a schematic cross section showing fluid flows in the assembly of FIG. 2.

Fittings are provided for channelling of liquid coolant such as water through the block (schematically in FIG. 3). These comprise an inlet fitting 75 receptive of the water from a supply 76 of sufficient pressure, and an outlet fitting 78 for discharging the water to a drain or to a heat exchanger with a pump for recirculating. Channelling 80 passes the water near the powder port 70 within the block for cooling the port and the powder 40 being carried therethrough. The coolant flow also is proximate the end of the block at the protrusion so as to cool the end face 82 and thus inhibit powder buildup on that face.

Another fitting 84 is provided for gas from a source 86 such as compressed air to be directed into gas passages 87 in the block. The gas is passed through the passages to a pair of air-jet extensions 88 extending from the block proximate the protrusion 74 on diametrically opposite sides thereof. At least one orifice 90 in each extension communicates with the gas passages 87 that extend into the extension. A central orifice 90 in each extension directs a jet of gas laterally onto the protrusion 74 of the powder port so as to cool the protrusion and inhibit powder from depositing thereon. Advantageously, one or preferably two pairs 94 of additional orifices in each extension also radiate from the gas passage in the extension. The additional orifices are arranged to direct gas grazingly past both sides of the extension to provide additional cooling and wiping of the block. Thus, in a preferable embodiment, each extension 88 has a total of five orifices extending radially and arcuately from the channel. The orifices may, for example, be 0.80 mm diameter for compressed air at $34.5 \times 10^3$ Pa (5.0 psi), and may have a flared opening.

The above-described powder injection apparatus is directed to reducing buildup on itself. Further precautions may be necessary for potential buildup on the nozzle face 95 (FIG. 1) One approach is to incorporate the features of the aforementioned U.S. Pat. No. 5,013,883 to generate a toroidal vortex at the face.

In another approach, according to a further embodiment of the present invention, the block has at least one other gas exit 96 (FIG. 2) therein communicating with the gas passages. The exit is disposed so as to direct gas at a face of the gun so as to cool same and inhibit powder from depositing thereon. Two or more such exit openings are preferred. Conveniently, each exit opening extends laterally from a separate gas passage. Such openings may have the same hole size as the jet orifices 90. As powder being injected tends to be drawn into the area of the nozzle face near the powder injection assembly, this embodiment is quite effective.

Figure 4:
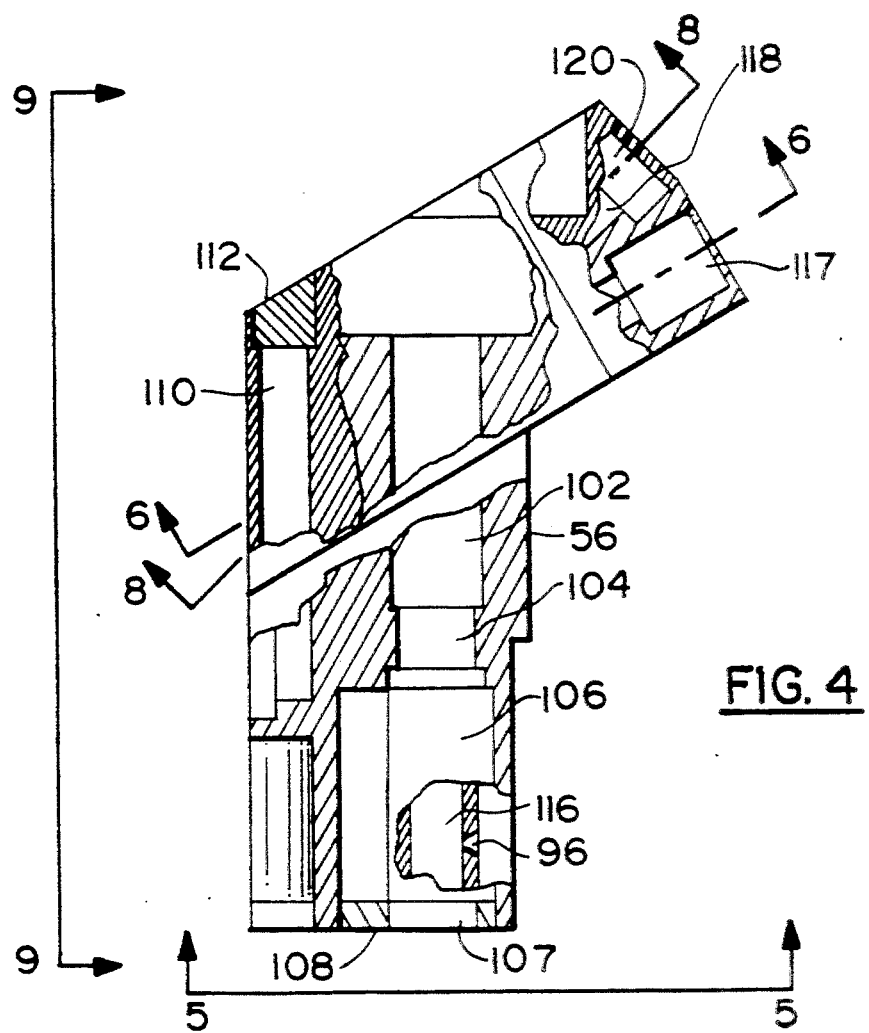
FIG. 4 is a vertical section of a block component of the assembly of FIG. 2.
Figure 5:
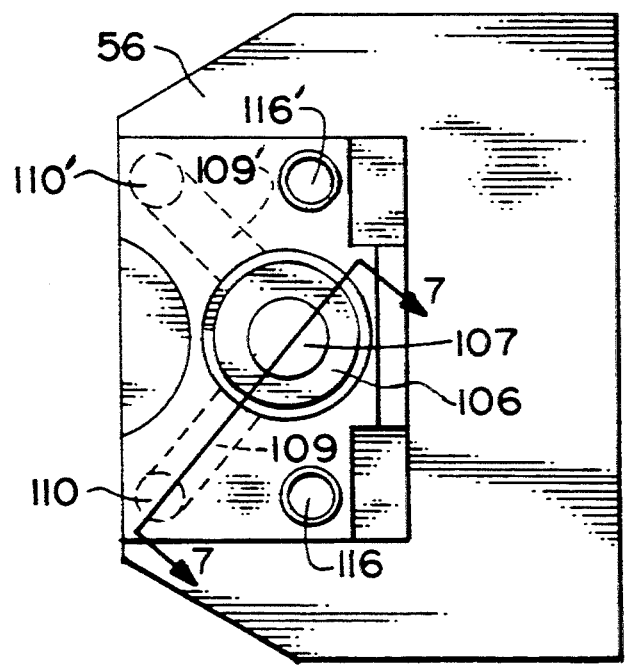
FIG. 5 is a view from 5—5 of the component of FIG. 5.
Figure 7:
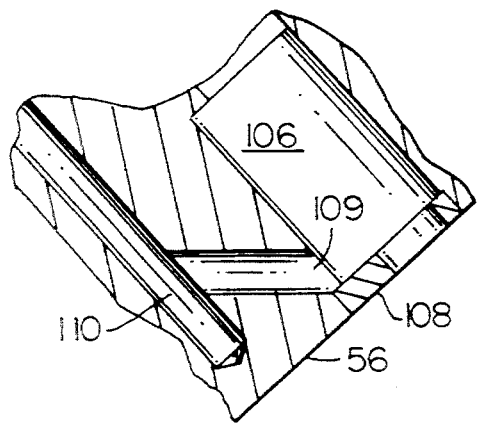
FIG. 7 is a section taken at 7—7 of FIG. 5.

FIGS. 4 et seq. are cross sections and views of the block 56 illustrating a way to form the channelling and passages therein. A central bore 102 is provided for the powder port and the powder inlet fitting 72 (FIG. 1). The latter is brazed, threaded or otherwise sealed in a medial portion 104 of the bore. An enlarged portion 106 of the bore at the powder outlet end of the port has a brazed plug 108 with a hole 107 for holding the powder port tube so that the enlarged portion channels water about the powder port tube. The enlarged portion is laterally offset from the port and hole 107 to allow drilling of angled channels 109, 109' (FIGS. 5 and 7) for the water flow to and from the port tube.

Figure 6:
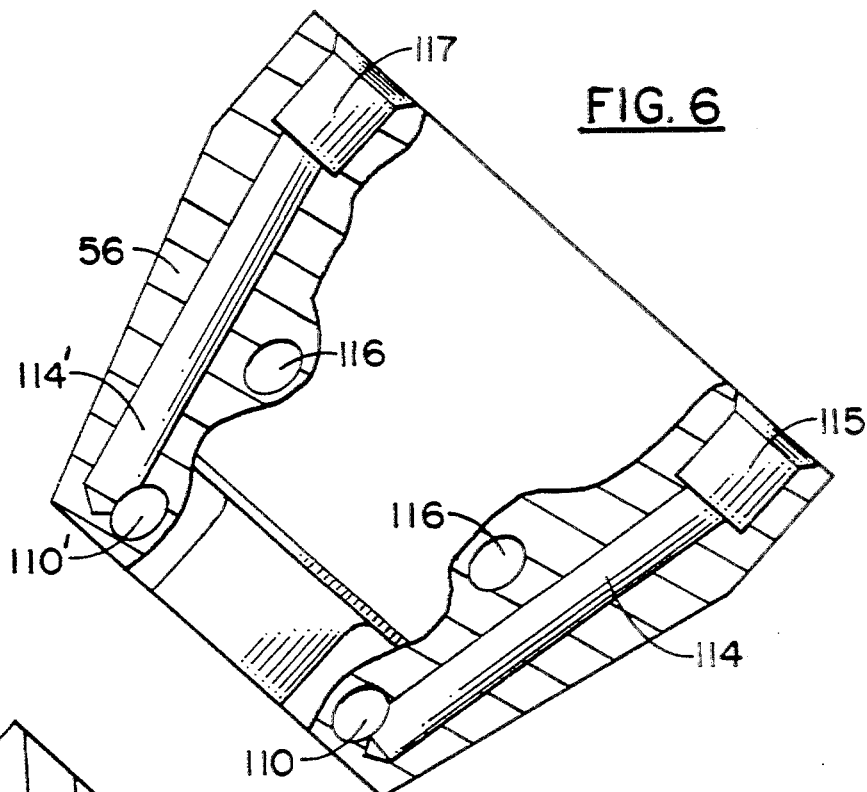
FIG. 6 is a section taken at 6—6 of FIG. 4.

A pair of side channels 110, 110' are drilled lengthwise partially through the block from the top. These channels are plugged 112 at their tops. Each of these lengthwise channels intersects one of the angled channels 109 or 109' leading from portion 106 of the bore (FIG. 7) and further intersects another channel 114 or 114' (FIG. 6) connecting to the corresponding inlet 115 (for fitting 74, FIG. 3) or outlet 117 (for fitting 78) for the water. Thus water flows from the inlet 115 through connecting channel 114 to lengthwise channel 110, through diagonal channel 109 to the enlarged section of bore 106, thence through diagonal channel 109' to lengthwise channel 110', and through connecting channel 114' to the outlet 117.

Figure 8:
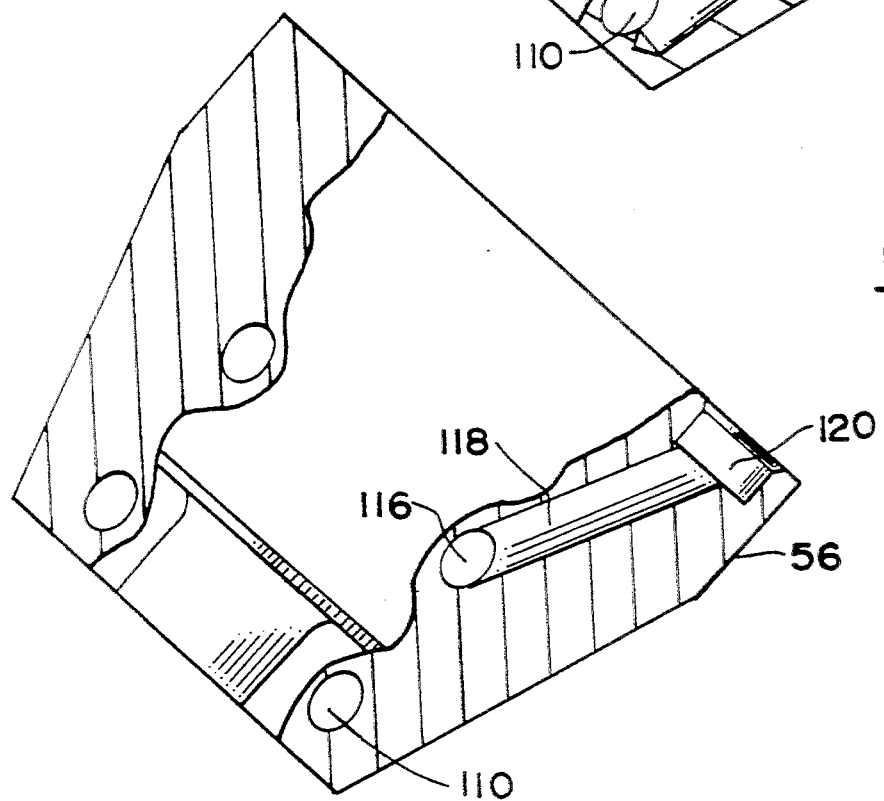
FIG. 8 is a section taken at 8—8 of FIG. 4.
Figure 9:
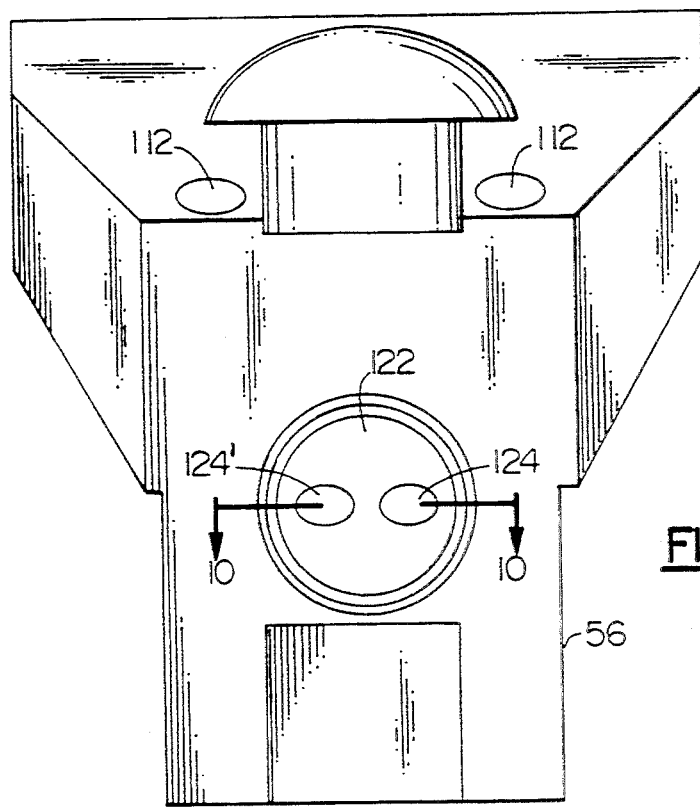
FIG. 9 is a view from 9—9 of the component of FIG. 4.
Figure 10:
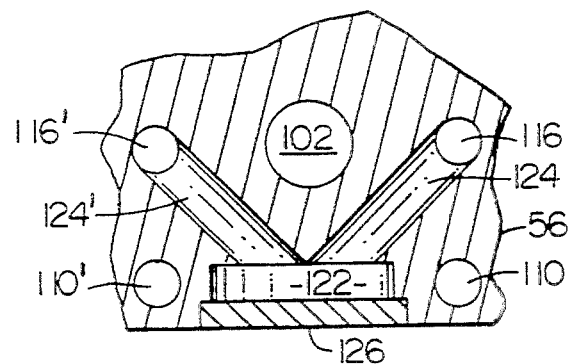
FIG. 10 is a section taken at 10—10 of FIG. 9.

For the gas aspect, a pair of longitudinal gas passages 116, 116' (FIGS. 4, 5 and 8) are drilled partially through each side of the block, each such passage being located near and parallel to a lengthwise water channel 110 or 110'. Each longitudinal passage extends into a corresponding extension 88 (FIG. 3) to intersect the air orifices 90. One end of each passage terminates at an orifice 90, in the extension 88, and the other end terminates in the block. A gas exit 96 extends from each longitudinal passage 116 near the orifice end. An angled passage 118 (FIG. 8) connects from the gas inlet 120, (of fitting 84, FIG. 2) to one of the longitudinal passages 116 or 116'. To connect between the longitudinal passages, a shallow hole 122 (FIGS. 9 and 10) is drilled into the outside face of the block between the water channels 110. Diagonal passages 124, 124' are drilled from the bottom of this hole to respective longitudinal passages 116, 116'. The top of the shallow hole is then sealed with a disk 126 brazed in place. Pressurized gas applied to the gas inlet 120 is thereby communicated by way of the passages 116, 116', 124, 124' to the gas jet orifices 90 in the extensions 88 at the powder port protrusion 74.

The combination of the water cooling and air jets is especially effective for substantially eliminating adherence and buildup of powder on the surfaces of the powder injection assembly and the face of the plasma spray gun. For example, a fine (16 to 31 microns) powder of composite or sintered aluminum oxide and titanium oxide is normally quite susceptible of buildup, especially at high spray rates. With utilization of two assemblies according to the present invention, set at 90° apart, feeding such powder at 4.8 kg/hr, spraying can be effected onto large shafts continuously significant without buildup.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

We claim:

1. Powder injection apparatus for a plasma spray gun, comprising:
   a block having channelling for coolant therein including a liquid inlet receptive of liquid coolant and a liquid outlet for discharging the liquid coolant from the block;
   a powder port extending through the block in proximity to the coolant channelling so as to be cooled by coolant flowing therein, the port having a powder inlet receptive of spray powder in a carrier gas, the port having a powder outlet end formed as a tubular protrusion extending from the block; and
   gas jetting means for directing at least one jet of gas onto the protrusion so as to cool same and inhibit powder from depositing thereon.

2. The apparatus of claim 1 wherein the block additionally has passage means therein for conveying gas through the block, the passage means includes a gas inlet receptive of pressurized gas, and the jetting means comprises a pair of extensions extending from the block proximate the protrusion on diametrically opposite sides thereof, each extension having at least one orifice therein communicating with the passage means, and each orifice being disposed so as to direct gas onto the protrusion.

3. The apparatus of claim 2 wherein each extension has a pair of additional orifices therein communicating with the passage means, the additional orifices being arranged to direct gas past both sides of the extension.

4. The apparatus of claim 2 further comprising means for mounting the block on a plasma spray gun so that the powder is injected into an arc plasma stream issuing from the gun.

5. The apparatus of claim 4 wherein the block has at least one additional gas exit opening therein communicating with the passages means, the exit opening being disposed so as to direct gas at a face of the gun proximate the plasma stream so as to cool said face and inhibit powder from depositing thereon.

6. The apparatus of claim 5 wherein the block has two such gas exit openings, the passage means include two gas passages each extending to an orifice in an extension, and each exit opening extends from a gas passage.

7. In a plasma spray apparatus including a plasma spray gun with a central cathode member and a cylindrical anode nozzle member having an axial bore therethrough with an inlet end and an outlet end, the inlet end being cooperative with a cathode member to generate an arc plasma stream issuing from the outlet end, a powder injection means mounted for injecting powder radially into the plasma stream external to the nozzle member proximate the outlet end, the powder injection means comprising:
   a block having channelling for coolant therein including a liquid inlet receptive of liquid coolant and a liquid outlet for discharging the liquid coolant from the block;
   a powder port extending through the block in proximity to the coolant channelling so as to be cooled by coolant flowing therein, the port having a powder inlet receptive of spray powder in a carrier gas, and the port having a powder outlet end formed as a tubular protrusion extending from the block; and
   gas jetting means for directing at least one jet of gas onto the protrusion so as to cool same and inhibit powder from depositing thereon.

8. The apparatus of claim 7 wherein the block additionally has passage means therein for conveying gas through the block, the passage means includes a gas inlet receptive of pressurized gas, and the jetting means comprises a pair of extensions extending from the block proximate the protrusion on diametrically opposite sides thereof, each extension having at least one orifice therein communicating with the passage means, and each orifice being disposed so as to direct gas onto the protrusion.

9. The apparatus of claim 8 wherein each extension has a pair of additional orifices therein communicating with the passage means, the additional orifices being arranged to direct gas past both sides of the extension.

10. The apparatus of claim 8 wherein the block has at least one additional gas exit opening therein communicating with the passage means, the exit opening being disposed so as to direct gas at a face of the gun proximate the plasma stream so as to cool said face and inhibit powder from depositing thereon.

11. The apparatus of claim 10 wherein the block has two such gas exit openings, the passage means include two gas passages each extending to an orifice in an extension, and each exit opening extends from a gas passage.

* * * * *